United States Patent [19]
Kim et al.

[11] Patent Number: 6,034,770
[45] Date of Patent: *Mar. 7, 2000

[54] INTERFEROMETRIC LASER SENSOR HAVING A LINEAR LASER CAVITY

[75] Inventors: Byoung-Yoon Kim; Hyo-Sang Kim, both of Taejon, Rep. of Korea

[73] Assignee: Korea Advanced Institute of Science and Technology, Taejon, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/800,075

[22] Filed: Feb. 12, 1997

[30] Foreign Application Priority Data

Feb. 12, 1996 [KR] Rep. of Korea ......................... 96-3330

[51] Int. Cl.$^7$ .............................. G01B 9/02; G01C 19/64
[52] U.S. Cl. ............................................. 356/345; 356/350
[58] Field of Search ..................................... 356/345, 350, 356/352; 385/12; 372/92, 94, 6; 250/227.19, 227.27

[56] References Cited

U.S. PATENT DOCUMENTS

| | | | |
|---|---|---|---|
| 3,392,622 | 7/1968 | Senf | 356/350 |
| 3,647,303 | 3/1972 | Kramer | 356/350 |
| 3,697,887 | 10/1972 | Lee et al. | 356/350 |
| 4,704,032 | 11/1987 | Auch et al. . | |
| 4,730,886 | 3/1988 | Hicks . | |
| 4,807,998 | 2/1989 | Weber | 356/350 |
| 4,886,333 | 12/1989 | Hicks . | |
| 4,964,131 | 10/1990 | Liu et al. . | |
| 5,018,859 | 5/1991 | Chang et al. . | |
| 5,270,791 | 12/1993 | Lefevre et al. . | |
| 5,663,792 | 9/1997 | Killpatrick et al. | 356/350 |

OTHER PUBLICATIONS

An Overview of Fiber–Optic Gyroscopes, Journal of Lightwave Technology, R.A. Bergh, et al., LT–2 (2) :91–107 (1984).

Synthetic Heterodyne Detection in a Fiberoptic Ring–Laser Gyro, S. Huang, et al., Opt. Lett., 18 (1) :81–83 (1993).

Polarization Control of Polarimetric Fiber–Laser Sensors, H.K. Kim, et al., Opt Lett., 18 (17):1465–1467 (1993).

Sagnac Effect, Reviews of Modern Physics, E.J.Post, 39(2):475–493 (1967).

New Fiber Laser Interferometer for Rotation Sensing, Advanced Sensing Photonics, Eleventh International Conference on Optical Fiber Sensors, H.S. Kim and B.Y. Kim, (May 21–24, 1996).

Comments about fiber–Optic Gyroscopes, Fiber Optic and Laser Sensors V, Herve C. Lefevre, SPIE (838):86–97 (1987).

Polarimetric Fiber Laser Sensors, H.K. Kim, et al., Opt. Lett., 18(4):320–322 (1993).

Mode–Locked Fiber Laser Gyroscope, M.Y. Jeon, et al., Opt. Lett., 18(4):320–322 (1993).

Stimulated Brillouin Fiber–Optic Laser Gyroscope, F. Zarinetchi, et al., Opt. Lett., 16(4):229–231 (1991).

*Primary Examiner*—Samuel A. Turner
*Attorney, Agent, or Firm*—Jacobson, Price, Holman & Stern, PLLC

[57] ABSTRACT

An interferometer-type laser sensor acts concurrently as a light source and to measure external physical quantities such as rotation, magnetic field, current and fluid velocity. The interferometer-type laser sensor has a laser resonator having a laser gain medium, optical path and two or more reflectors to reflect incident light toward an opposite direction. In addition, a device is provided for interfering light not reflecting on the said reflectors but passing through. A signal processor is provided to detect and process interference signal generated from the interfering device. The laser sensor has a distinction over the conventional passive fiber-optic gyroscope as followings: first, expensive polarization maintaining fiber or polarizer is not required, since there is no polarization error which is readily appeared at the conventional passive fiber-optic gyroscope. Secondly, wavelength-dependent errors generating during the use of a light source of wide width decrease remarkably by employing a laser of narrow width. Thirdly, an external light source is not required, since a laser resonator acts concurrently as a light source and measures external physical quantity.

14 Claims, 3 Drawing Sheets

INTERFEROMETRIC LASER SENSOR HAVING A LINEAR LASER CAVITY

FIELD OF THE INVENTION

The present invention relates to a novel laser sensor, more specifically, to an interferometer-type laser sensor which acts concurrently as a light source and means for measuring external physical quantities such as rotation, magnetic field, current and fluid velocity, which comprises a laser resonator consisting of a laser gain medium, optical path and two or more reflectors to reflect incident light toward an opposite direction, means for interfering light not reflecting on the said reflectors but passing through, and a signal processor to detect and process interference signal generated from the interfering means.

BACKGROUND OF THE INVENTION

Laser has been simply used as a light source of various optical systems. Recently, sensors employing a change in properties of a laser such as frequency, polarization and phase, etc. in accordance with a change in external physical quantities, have been suggested.

Among them, a ring laser gyroscope has been applied in various fields (see: W. W. Chow et al., "The Ring Laser Gyro", Rev. of Mod. Phys., 57(1):61(1985)), which has advantages that: its structure is simple, intensity of optical signal is strong, and signal processing is easily made. As schematically depicted in FIG. 1, the said ring laser gyroscope comprises a ring laser resonator consisting of a laser gain medium(111) and reflecting mirrors(112, 113, 114).

If the laser gain medium in the ring laser gyroscope is activated by external energy, light is generated and amplified in the medium, and the laser oscillates. Since there are two laser beams(121, 122) with different directions in the resonator, one laser beam(121) and the other laser beam (122) circulate in clockwise and counterclockwise directions in the resonator, respectively. If the resonator rotates, the two beams circulating in the same and opposite direction against the direction of the resonator's rotation experience different optical path lengths, respectively, which is commonly known as "Sagnac effect". Owing to the Sagnac effect, the counterpropagating laser beams have different resonant conditions, thus the two laser beams have different frequencies whose difference is proportional to rotation rate. Portions of the two laser beams do not reflect on the reflecting mirror(114) and pass through it, which gives rise to laser output beams(123, 124). The laser output beams(123, 124) reflect on the reflecting mirrors(115, 116), respectively, thus meet at an optical beam splitter(117), which results in interference. On the other hand, a beam(125) moving in one direction from the optical beam splitter(117) has a signal corresponding to the said frequency difference, which is detected by an optical detector to measure rotation rate.

However, two beams generating from such a ring laser gyroscope are amplified in the same laser gain medium. Thus, gain competition, a phenonmenon that the intensity of a beam circulating in one direction decreases when the intensity of a beam circulating in the other direction increases, is caused, which gives rise to a shortcoming of unstability in the intensity of an output beam. Also, if rotation rate of the laser resonator is low, change in frequency caused by the rotation rate does not occur, which is called as lock-in effect, and the rotation rate can not be measured.

On the other hand, a passive fiber-optic gyroscope has been also reported in the art, as one of typical sensors to measure rotation rate. A general passive fiber-optic gyroscope is schematically depicted in FIG. 2(see: R. A. Bergh et al., "An Overview of Fiber-Optic Gyroscope", IEEE J. Lightwave Tech., LT-2:91(1984)), which permits measurement of magnetic field, current, etc., as well as rotation rate. It works on the principle that light from a light source(211) passes through directional couplers(212, 213), and propagates in clockwise and counterclockwise directions in the fiber loop, respectively. In this connection, light intensity measured in an optical detector(215) is proportional to $(1+\cos(\Delta\phi))$ wherein $\Delta\phi$ is a phase difference between the counterpropagating lights. If there is no nonreciprocal effect (rotation and magnetic field, etc.), a phase difference between two lights is 0. However, if there exists rotation or magnetic field, etc., two lights experience different optical path length during propagation around Sagnac loop (214). Therefore, output depends on the rate of rotation and the intensity of magnetic field. Accordingly, the rate of rotation and the intensity of magnetic field can be determined by measuring the intensity of an output light, and current can be determined considering on the magnetic field generated by the current.

However, the said passive fiber-optic gyroscope has revealed a serious problem that: if the counterpropagating lights have different states of polarization by a birefringence existing in an optical fiber, errors in measurement may occur(see: H. Lefevre, in "The Fiber-Optic Gyroscope", Artech House, p.73(1993)).

In order to solve the said problem, a method for constructing Sagnac loop employing a polarization maintaining fiber was suggested(see: U.S. Pat. No. 5,270,791). However, the method has not been practically applied in the art, since such a polarization maintaining fiber costs high.

Also, two directional couplers were employed between a light source and Sagnac loop in order to remove phase error generating in a directional coupler(see: U.S. Pat. No. 4,964, 131). However, the prior art has also revealed a shortcoming that light intensity detected by an optical detector is reduced to below a quarter of intensity of light from a light source, since only a part of light from a light source(211) passes through a directional coupler(212) and is detected by an optical detector(215).

SUMMARY OF THE INVENTION

The present invention solves to solve the problems of the prior art. External physical quantity can be measured without gain competition or polarization error, when two lights generated from both ends of a laser resonator, which consists of a laser gain medium, optical path and two or more reflectors to reflect incident light toward an opposite direction, pass through the same optical path again to give interference, and output of the interfered light is measured.

The primary object of the present invention is, therefore, to provide a simple interferometer-type laser sensor which permits measurement of external physical quantity without gain competition or polarization error.

BRIEF DESCRIPTION OF DRAWINGS

The above and the other objects and features of the present invention will become apparent from the following description given in conjunction with the accompanying drawing, in which.

DETAILED DESCRIPTION OF THE INVENTION

The interferometer-type laser sensor of the present invention comprises:

An interferometric laser sensor which comprises:

a laser resonator having light, a laser gain medium to lase the light, an optical path, and two or more reflectors;

a pumping means to pump the light through the laser gain medium;

a filter for electing a single axial mode or a group of axial modes to lase;

an external means to apply a nonreciprocal phase shift to the light in said resonator;

an interfering means for interfering two laser output beams, each laser output beam emitted through different reflectors of said resonator to provide an interference signal; and a signal processor to detect and process the interference signal generated by said interfering means to measure an amount of nonreciprocal phase shift applied by said external means.

In the laser sensor of the invention, laser media conventionally used in the art such as He—Ne gas, a Nd-YAG rod, a Nd:glass rod, a Nd rod, a ruby rod, dye cell, a rare-earth-doped optical fiber and a diode amplifier may be employed as a laser medium. Moreover, conventional optical path such as vacuum, air, glass, $LiNbO_3$ crystal and optical fiber may be used as optical path; and, conventional reflectors such as a reflecting mirror, a fiber-optic Bragg grating, a fiber-optic loop mirror and a Faraday reflecting mirror may be used as a reflector.

When external physical quantity is measured by using the laser sensor of the invention, the laser resonator oscillates one or more laser modes, and if two or more laser modes are oscillated, all mode numbers must be even or odd.

In the laser sensor of the invention, the interfering means may be conventional interferometers such as a beam splitter, a fiber-optic directional coupler, an integrated optic device and a micro optic device. Also, when velocity of a fluid such as a running water, etc. is measured, a running fluid per se plays a role as interfering means and additional interferometer is not required. In order to modulate interference signal, interfering means of the laser sensor may further comprise an integrated optic device, a phase modulator such as a PZT phase modulator and a micro optic device modulator, or a signal modulator such as a frequency converter.

In the laser sensor of the invention, a signal processor comprises a detector for detecting an interference signal and a signal processing circuit to process an interference signal electrically.

Preferred embodiments of the present invention are explained in more detail with references of the accompanying drawings, which should not be taken to limit the scope of the invention.

Figure 1:
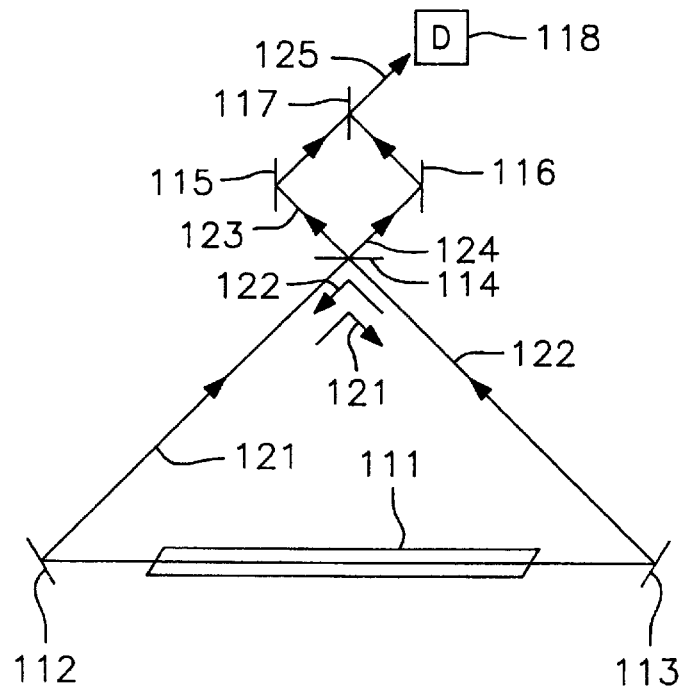
FIG. 1 is a schematic diagram showing a conventional ring laser gyroscope.
Figure 2:
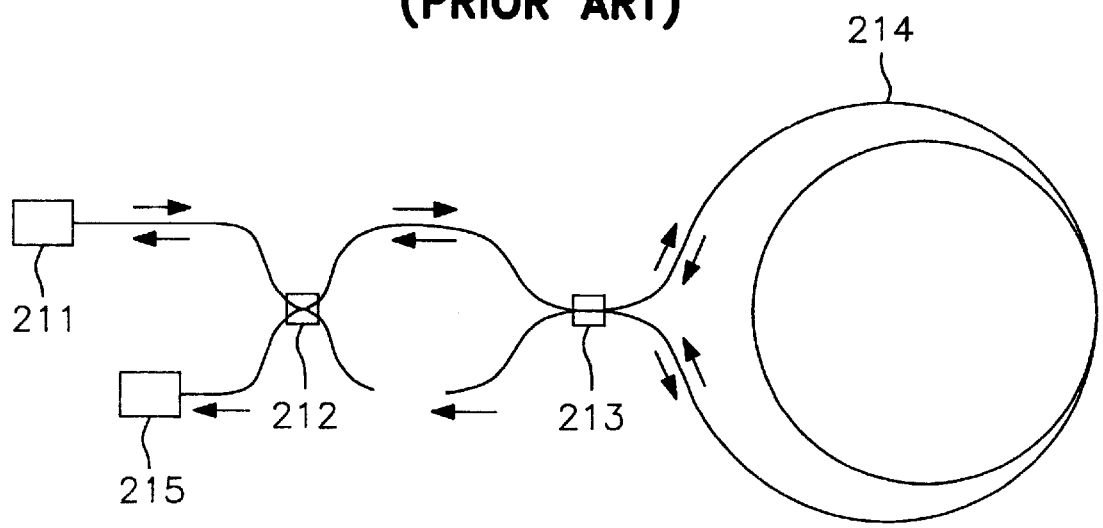
FIG. 2 is a schematic diagram showing a conventional passive fiber-optic gyroscope.
Figure 3:
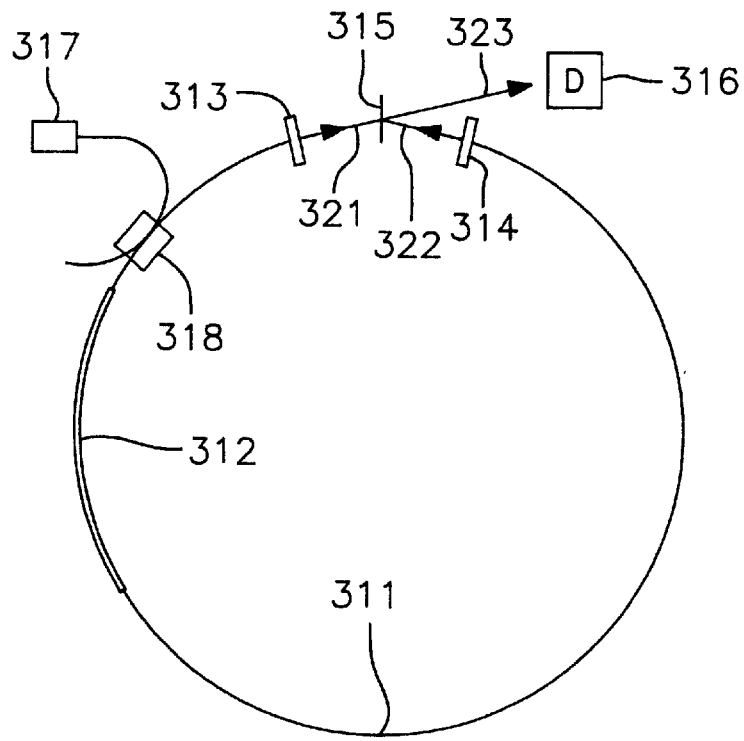
FIG. 3 is a schematic diagram showing an interferometer-type laser sensor in accordance with a preferred embodiment of the invention.

FIG. 3 is a schematic diagram showing an interferometer-type laser sensor, in accordance with a preferred embodiment of the invention. In this laser sensor, a rare-earth-doped optical fiber is used as a laser gain medium(312), and the rare-earth element is activated by pumping light which is provided by passing through a wavelength multiplexing coupler(318) from a laser diode(317). An optical fiber is used as optical path(311), and two reflecting mirrors (313, 314) are attached to both ends of the optical path as reflectors. Also, a beam splitter(315) is used as means for interfering light from both ends of a laser resonator, and signal change of the interferometer is determined by detecting the interfered signal(323) by an optical detector(316). The change of the interfered signal thus detected is electrically processed in a signal processor(not shown in the drawing), which leads to successful measurement of external physical quantity.

As can be seen in FIG. 3, a laser employed in a laser sensor of the invention is distinguished from the conventional ring laser gyroscope in a sense that its cavity does not form a closed circuit. Also, since a laser resonator in the laser sensor consists of a laser gain medium, optical path and two or more reflectors to reflect incident light toward an opposite direction, lights moving toward both directions have the same oscillating modes. Thus, a phenomenon of gain competition does not occur. Moreover, depending on the resonant condition of the laser resonator, states of polarization of lights propagating toward both directions in the resonator experience the same physical phenomenon. Therefore, errors caused by polarization appeared at the conventional passive fiber-optic gyroscope do not occur.

With reference to FIG. 3, working principle of the interferometer-type laser sensor of the invention is explained as follows:

In general, if nonreciprocal effects such as rotation and magnetic field, etc. do not exist on the sensor system, phase difference between two output lights(321, 322), i.e., $\Delta\phi_{AB}$ is represented as $m \pi$ where m is axial mode number of oscillating laser mode which is a natural number(see: A. E. Siegman, "Laser", University Science Books, Mill Valley Calif.., p.436(1986)). Under a laser mode having the axial mode number of m, m is given by $m=2nL/\lambda_m$, provided that oscillating wavelength of a laser, length of a resonator and a refractive index of the resonator are represented as $\lambda_m$, L and n, respectively.

When a distance from a beam splitter(315) to a reflecting mirror(313) is the same as a distance to the other reflecting mirror(314), laser mode having the axial mode number of m oscillates alone, and output lights(321, 322) have the same intensity of $I_o$, intensity of an interfered output light(323), $I_{out}$ is given by:

$$I_{out}=2I_o(1+\cos(\Delta\phi_{AB}))=2I_o(1+(-1)^m)$$

If the system rotates, lights travelling in the same and opposite directions against the direction of rotation have different path length of a resonator. At this time, the change in the oscillating wavelength of a laser is negligible, and phase difference, $\Delta\phi_{AB}$ is represented as(see: E. J. Post, "Sagnac Effect", Rev. of Modern Phys., 39(2):475(1967)):

$$\Delta\phi_{AB}=m \pi+2 \pi L/\lambda_m(R\Omega/c)$$

wherein,

L is length of a resonator;

$\lambda_m$ is oscillating wavelength of a laser;

R is a radius of the system; and,
c is velocity of light.

Also, intensity of the interfered output light(323), $I_{out}$ is represented as:

$$I_{out}=2I_o(1+\cos(\Delta\phi_{AB}))=2I_o\{1+(-1)^m \cos((2\pi L/\lambda_m)(R\Omega/c))\}$$

Therefore, change in phase difference($\Delta\phi_{AB}$) and consequent rotation rate of a system, can be determined by measuring the change in intensity of the output light, $I_{out}$. Also, the laser sensor permits measurement of magnetic field, since Faraday effect, etc. as well as rotation may have the same effect thereon(see: K. Bohm, Optics Lett., 7:180(1982)).

On the other hand, the above equation further suggests that intensity of the interfered output light varies with axial mode number of oscillating laser mode, when there are several oscillating laser modes. If a mode having axial mode number of m and a mode having axial mode number of (m+1) are oscillated in the same intensity, the change in the output intensity of one mode has opposite sign with that of the other mode, which gives rise to a shortcoming that rotation rate can not be determined. However, if a mode having axial mode number of m and a mode having axial mode number of (m+2) are oscillated, the term including rotation rate in the above equation is not cancelled with each other, which always permits determination of rotation rate. Accordingly, oscillating laser modes have to be selected in order that all of mode numbers are even or odd, when there are several oscillating laser modes. Based on the facts, the laser sensor of the invention comprises a filter permitting selection of axial mode number of laser mode outside the resonator, which allows that all axial mode numbers of interfered laser modes are selected to be even or odd.

In the laser sensor of the invention, signal processing to measure an interfered output light can be carried out by various methods. As a basic approach, a method for detecting the change in phase by measuring the change in spatial distribution of interference fringe of an interfered output light can be employed. In addition, homodyne and heterodyne signal processing techniques used in the conventional interferometers may be used, by employing a phase modulator or a signal modulator such as a frequency converter between a beam splitter(315) and a reflecting mirror(313 or 314) (see: "Optical Fiber Sensors" Vol.2, B. Culshaw and J. Dakin Eds., Artechhouse, p.338(1989)).

Also, various methods of phase modulation such as sinusoidal modulation, saw-tooth modulation and square-wave modulation, and synthetic heterodyne method used in the conventional passive fiber-optic gyroscopes may be employed(see: "Optical Fiber Rotating Sensing", W. K. Burns Eds., Academic Press Inc.(New York), Chap.3 (1994)).

Figure 4:
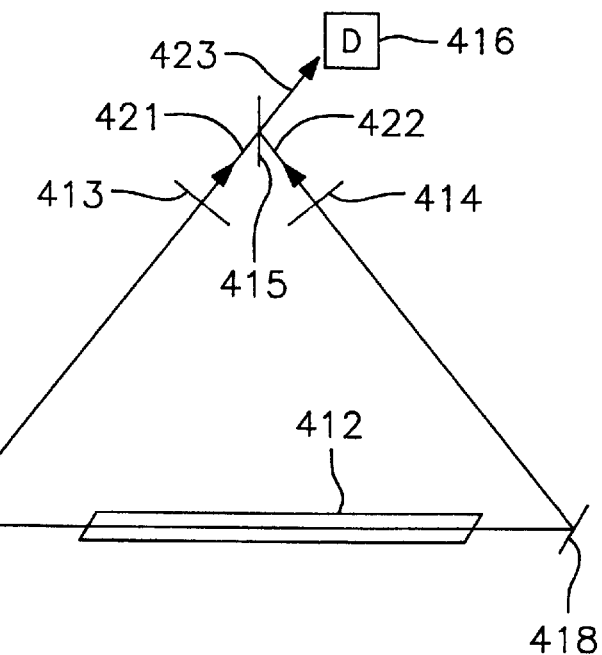
FIG. 4 is a schematic diagram showing an interferometer-type laser sensor in accordance with the other preferred embodiment of the invention.

The laser sensor of the invention may comprise two or more reflecting mirrors. FIG. 4 is a schematic diagram showing a laser sensor in accordance with the other preferred embodiment of the invention which comprises four reflecting mirrors. As can be seen in FIG. 4, two reflecting mirrors(417, 418) are attached to both sides of a gain medium(412), and two reflecting mirrors (413, 414) are also attached to both ends of optical path. An interferometer for interfering lights from both ends of laser consists of a beam splitter(415), which also appears in the laser sensor in accordance with the afore-mentioned preferred embodiment of the invention, and signal change of the interferometer is determined by detecting the interfered signal (423) by an optical detector(416). Also, a He—Ne discharge tube, a ruby rod, a Nd:YAG rod or dye cell, etc. may be used as a laser medium(412), respectively.

Figure 5:
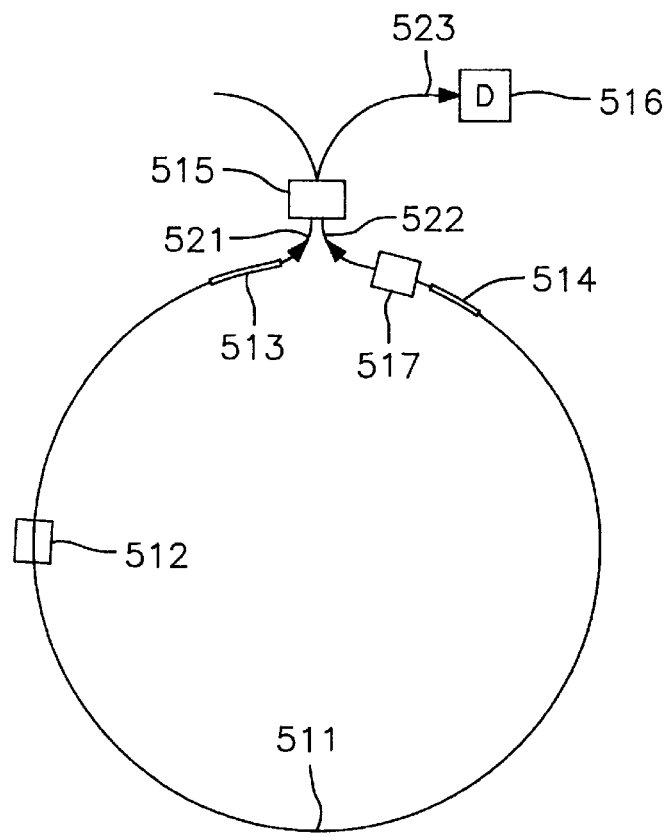
FIG. 5 is a schematic diagram showing an interferometer-type laser sensor in accordance with another preferred embodiment of the invention.

FIG. 5 is a schematic diagram showing a laser sensor in accordance with another preferred embodiment of the invention. In the laser sensor of the invention, a diode amplifier is used as a laser medium(512), and an optical fiber is used as optical path(511), respectively. Fiber-optic Bragg gratings (513, 514) are used as reflectors attached to both ends of the optical path. Also, a fiber-optic directional coupler, an integrated optic device or a micro optic device, etc. may be used as an interferometer(515) for interfering an output light, and in order to modulate interference signal, an integrated optic device, a PZT phase modulator or a signal modulator(517) such as a frequency converter may be used. Accordingly, in accordance with the laser sensor of the invention, various components and signal processing may be selected.

Figure 6:
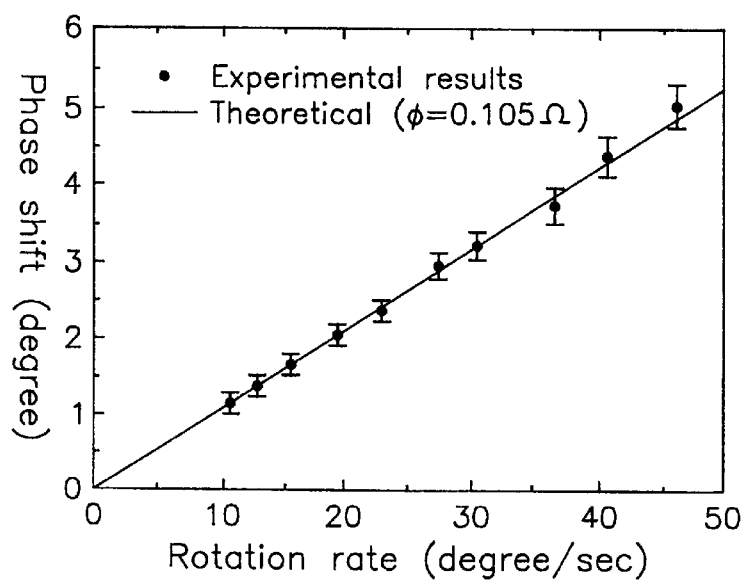
FIG. 6 is a graph showing the result to measure rotation rate using an interferometer-type laser sensor of the invention.

FIG. 6 is a graph showing the phase shift in accordance with rotation rate in the laser sensor depicted in FIG. 3. As can be seen in FIG. 6, it was found that experimental phase shift measured by the laser sensor corresponds to theoretical value.

As clearly illustrated and demonstrated as aboves, the present invention provides a novel laser sensor of interferometer-type. The laser sensor of the invention has a distinction over the conventional passive fiber-optic gyroscope as follows:

First, expensive polarization maintaining fiber or polarizer is not required, since there is no polarization error which is readily apparent at the conventional passive fiber-optic gyroscope;

Secondly, wavelength-dependent errors generating during the use of a light source of wide width decrease remarkably by employing a laser of narrow width; and, Thirdly, an external light source is not required, since a laser resonator acts concurrently as a light source and means for measuring external physical quantity.

In addition, the laser sensor has a distinction over the conventional ring laser gyroscope as followings:

First, unstability in the intensity of an output beam which is caused by gain competition generating between counter-propagating lights is not caused;

Secondly, lock-in effect does not occur, so that even the low rotation rate can be measured.

Although the preferred embodiments of the present invention have been disclosed for illustrative purpose, those who are skilled in the art will appreciate that various modifications, additions and substitutions are possible, without departing from the scope and spirit of the invention as disclosed in the accompanying claims.

What is claimed is:

1. An interferometric laser sensor which comprises:
    a linear laser resonator having light, a laser gain medium to lase the light, an optical path, and two or more reflectors;
    a pumping means to pump the light through the laser gain medium;
    a filter for selecting a single axial mode or a group of axial modes to lase;
    an external means to apply a nonreciprocal phase shift to the light in said resonator;
    an interfering means for interfering two laser output beams, each laser output beam emitted through different reflectors of said resonator to provide an interference signal; and
    a signal processor to detect and process the interference signal generated by said interfering means to measure an amount of nonreciprocal phase shift applied by said external means.

2. The interferometric laser sensor of claim 1, wherein the laser gain medium is a rare-earth-doped optical fiber.

3. The interferometric laser sensor of claim 1, wherein the laser gain medium is a semiconductor amplifier.

4. The interferometric laser sensor of claim 1, wherein the optical path includes an optical fiber.

5. The interferometric laser sensor of claim 1, wherein the reflector is at least one selected from the group consisting of a partial-reflecting mirror and a fiber-optic Bragg grating.

6. The interferometric laser sensor of claim 1, wherein said filter includes a saturable absorber having a spatial hole burning effect that provides mode-number dependent optical loss.

7. The interferometric laser sensor of claim 1, wherein said filter includes the laser gain medium having a spatial hole burning effect that provides mode-number dependent gain.

8. The interferometric laser sensor of claim 1, wherein said filter selects either even-number axial modes or odd-number axial modes.

9. The interferometric laser sensor of claim 1, further comprising an external filter outside said laser resonator that selects one or more of the laser axial modes emitted from said laser resonator.

10. The interferometric laser sensor of claim 1, wherein said external means is a rotation of said laser resonator, and the nonreciprocal phase shift is provided by a Sagnac effect.

11. The interferometric laser sensor of claim 1, wherein said external means is a magnetic field, and the nonreciprocal phase shift is provided by a Faraday effect.

12. The interferometric laser sensor of claim 1, wherein said interfering means includes at least one selected from the group consisting of a beam splitter, a partial-reflecting mirror, a fiber-optic directional coupler, an integrated-optic branching device, and a micro-optic branching device.

13. The interferometric laser sensor of claim 11, wherein said interfering means further comprises a phase modulator or a frequency shifter.

14. The interferometric laser sensor of claim 1, wherein said signal processor is arranged to detect the phase of the interference signal.

* * * * *